June 19, 1945.  G. F. SMYTH  2,378,508
EYE GUARD
Filed Aug. 18, 1943

GEORGE F. SMYTH
INVENTOR

BY *J. A. Ollestad*
ATTORNEY

Patented June 19, 1945

2,378,508

UNITED STATES PATENT OFFICE 2,378,508

EYE GUARD

George F. Smyth, Pittsford, N. Y., assignor to Bausch & Lomb Optical Company, Rochester, N. Y., a corporation of New York Application August 18, 1943, Serial No. 499,091

2 Claims. (Cl. 88—1)

This invention relates to eye caps for optical instruments and, more particularly, to an adjustable eye cap for such an instrument.

The eye cap of the present invention, in the broadest aspects thereof, may be used on any instrument in which the eye of the user is brought into close proximity to an eye lens in the use of the instrument. It is particularly adapted for use with binoculars and for the purpose of illustration, the present invention eye cap has been shown as applied to an ocular tube of a binocular.

Many optical instruments such as binoculars are constructed with an eye cap which, when brought up against the face adjacent to the eye of the observer, spaces the former the proper distance from the eye lens of the instrument. Although such instruments can be used by observers wearing eye glasses, or any device in which corrective or protective lenses are worn in front of the eye, the field of vision is considerably reduced as the eye is spaced too great a distance from the eye lens of the instrument.

Heretofore, to obviate this difficulty, eye caps have been installed which in normal use would properly space the eye of the user from the eye lens of the instrument, but which could be adjusted for use by observers wearing eye glasses and the like. These devices have generally comprised caps which could be either folded down for use by an observer wearing lenses or were movable axially of the ocular tube of the instrument to permit a user wearing lenses to space his eyes the proper distance from the eye lens of the instrument. In the first mentioned class of eye caps, the part of the cap normally next to the eye could be folded over upon the part further away from the eye, thus reducing the axial length of the eye cap. When the instrument was again to be used by a person not wearing lenses in front of his eyes, the folded over portion was forced back into its normal position.

In the type of eye cap which is movable axially as a whole so that it can be placed and held in more than one position relative to the eye lens, the cap was generally held in a normal extended position by a spring which could be compressed when the cap was to be moved to the position in which it would be used by an observer wearing lenses. The spring not only complicated the manufacture of the eye caps and increased the cost thereof, but it also rendered the eye cap difficult to keep in proper working condition.

The difficulty found in the adjustable eye caps is obviated by the eye cap of present invention for the same is made of an integral resilient piece which will assume a normal position but which can be adjusted by a user wearing lenses by merely bringing the lens caps up against the lenses in front of the eye. In the now preferred embodiment of the eye cap of present invention, it comprises a tubular member of resilient material such as rubber formed with a mounting portion at one end thereof by means of which it can be attached to the ocular tube of the instrument. The opposite end of the cap is provided with a plurality of inwardly extending slots forming a plurality of fingers integral with the mounting portion. The fingers or the segments of the cap intermediate the slots, as the material of the cap is flexible, will flex outwardly when pressure is exerted against the slotted end portion of the cap and shorten the overall length of the same. Thus by merely pushing the eye cap against the lens, the slotted portion will assume a position such that the eye lens of the instrument can be spaced the distance from the eye of the observer as to afford the widest field possible. When the instrument is removed from in front of the eyes of the user, the cap will immediately return to its normal position without any adjustment on the part of the user.

Other features and advantages of the device of the present invention will appear from the following description taken in connection with the accompanying drawing in which.

The eye cap of the present invention comprises a substantially tubular member formed of some resilient material such as rubber. The wall of the cap adjacent one end thereof, as shown at 11, is thickened to provide a substantial mounting portion for the cap.

Figure 1:
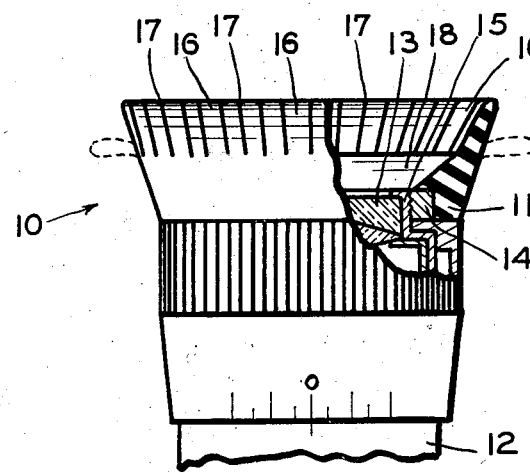
Fig. 1 is a side elevational view with parts in section of the eye cap of the present invention applied to an ocular tube and showing in full lines the eye cap in its normal position.
Figure 2:
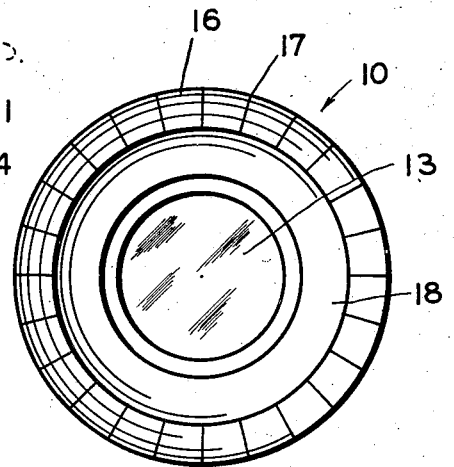
Fig. 2 is a top plan view of the eye cap of the present invention.

In the form of the invention shown in Fig. 1, the cap 10 is shown mounted to an ocular tube 12, carrying a lens system including an eye lens 13. Although the cap may be secured to the ocular tube by any means desired, in the form of the invention illustrated in Fig. 1, the cap is provided with a ring 14 which may be formed of metal or hard rubber and secured on a seat formed in the thickened wall portion 11 of the cap by a suitable cement or some vulcanizing process. The inner wall of the ring 14 is threaded so that it can be turned onto the threaded portion 15 of the tube 12 to secure the cap to the latter.

The cap is provided at the end opposite to the mounting end 11 with a plurality of fingers 16 formed by slots 17 extending inwardly of the end wall of the cap to the shoulder 18 formed by the thickened mounting portion 11 of the cap.

It will be understood that the fingers 16 will normally assume the full line position shown in Fig. 1. A user who is not wearing eye glasses, or any device in which lenses are disposed in front of the eyes, will in the use of the instrument, bring the same up into a position in which the end wall or surface of the fingers 16 contact the face adjacent to the eye. The length of the cap is such that the same, when the instrument is brought up into the position just described, will properly space the eye from the eye lens 13.

If the user is wearing eye glasses, or any device which mounts lenses before his eyes, it is only necessary for the user to bring the instrument up into a position in front of the eyes and then urge the instrument back against the lens worn before the eye with sufficient force to cause the fingers 16 to flex outwardly to the position as shown in dotted lines in Fig. 1. As the material of the cap is quite resilient, very little force is necessary to urge the fingers outwardly so that the instrument may be brought back into a position wherein the lens worn before the eye of the user is contacting the shoulder 18. With the lens worn by the user contacting the shoulder 18, the eye of the observer will be spaced approximately the same distance from the eye lens 13 as is the eye of a user not wearing lenses before his eyes when he uses the instrument.

When the instrument is no longer being used, that is when the instrument is moved out of its position in front of the eyes of the user, the fingers will automatically return to their normal fully extended position. Thus, the eye cap of the present invention is adjustable for both classes of users without the necessity of manually grasping the cap to adjust the same.

As the material of the cap is resilient, there is no danger of the cap scratching or marring the lenses worn by the user when the cap is urged against the same.

Figure 3:
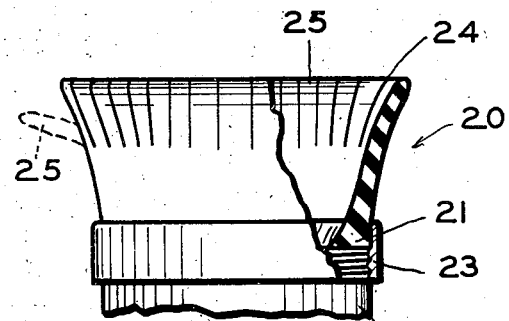
Fig. 3 is a view somewhat similar to Fig. 1 but showing a modified form of the eye cap.

In the embodiment shown in Fig. 3, the cap 20 is formed adjacent one end thereof with a thickened wall portion 21 which may be slipped over the end of the ocular tube 22 and held in a reentrant groove formed in the ocular tube 22 by a threaded locking ring 23. The free end of the cap is provided with a plurality of slots 24 which form the fingers 25. The cap 20 is formed of resilient material and is used as is the cap 10 of the earlier described embodiment of the invention.

Figure 4:
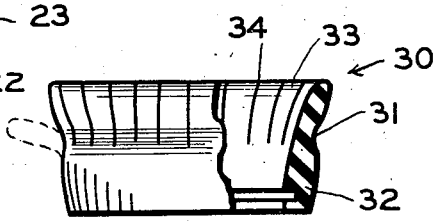
Fig. 4 is a side elevational view with parts in section of a further modified form of the eye cap of the present invention.

Fig. 4 illustrates a still further modified embodiment of the invention. The cap 30 as shown in Fig. 4 is formed of some soft resilient material having an annular groove 31 extending about the outer surface thereof. The somewhat cylindrical portion 32 of the cap is used for mounting the cap to an ocular tube in that this portion can resiliently grip the tube to which it is to be mounted.

The annular groove 31 reduces the thickness of the wall and facilitates flexing of the fingers 33 formed by the slots 34. It will be seen that the groove 31 in effect forms a hinge to permit the fingers 33 to be more easily bent over into the position shown in dotted line in Fig. 4, when the same are urged against the lens worn by the user.

It will be seen that, in all embodiments of the invention illustrated, the eye of the observer, whether or not eye glasses or lenses such as are fitted into gas masks or similar devices are worn before the eyes, can be spaced from the eye lens of the instrument the distance necessary to afford to the observer as large a field as is possible with the optics of the instrument.

While the present preferred embodiments of the invention have been illustrated and described herein, it is to be understood that the invention is not limited thereby but is susceptible of changes in form and detail within the scope of the appended claims.

I claim:

1. An eye cap for an optical instrument having an ocular tube carrying an eye lens comprising a substantially tubular member of resilient material having an end portion provided with a plurality of inwardly extending slots forming a plurality of fingers integral with said cap, the wall of said member at the opposite end portion being thickened, the thickened wall portion forming an internal annular shoulder adjacent the inner ends of said slots; and means for attaching the thickened end portion to the ocular tube of the instrument, the eye cap being of such a length that the eye of an observer is spaced a predetermined desired distance from the eye lens of the instrument when the outer ends of said fingers are brought into engagement with the face of an observer, the material of said cap being sufficiently flexible to permit an observer wearing a lens before his eye to flex said fingers outwardly by forcing said cap against the lens worn before his eye until the lens worn by the observer contacts the said shoulder and the eye of the observer is disposed the said predetermined desired distance from the eyelens of the instrument.

2. An eye cap for an optical instrument having an ocular tube carrying an eye lens comprising a flexible substantially tubular member; means for securing one end of said member to said ocular tube; and a plurality of fingers integrally formed with said tubular member and being normally disposed in edgewise engagement, the eye cap being of such a length that the eye of an observer is spaced a predetermined distance from the eye lens of the instrument when the outer ends of said fingers are brought into engagement with the face of an observer, the wall of said member adjacent the inner ends of said fingers being reduced and the material of said cap being sufficiently flexible to permit an observer wearing a lens before his eye to bend said fingers outwardly at the reduced portion of said wall by forcing said cap against the lens worn before his eye and thereby shorten the overall length of said cap whereby the eye lens of the instrument may be disposed substantially the same distance from the eye of the last-named observer as the said eye lens is from the eye of the first-named observer when the latter brings the outer ends of the fingers into contact with his face.

GEORGE F. SMYTH.